(12) United States Patent
Tokuyama et al.

(10) Patent No.: US 10,873,178 B2
(45) Date of Patent: Dec. 22, 2020

(54) WIRE HARNESS PROTECTOR AND MANUFACTURING METHOD OF WIRE HARNESS

(71) Applicant: Yazaki Corporation, Tokyo (JP)

(72) Inventors: Shizuaki Tokuyama, Tochigi (JP); Shinji Sonda, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 153 days.

(21) Appl. No.: 16/164,446

(22) Filed: Oct. 18, 2018

(65) Prior Publication Data
US 2019/0123530 A1 Apr. 25, 2019

(30) Foreign Application Priority Data
Oct. 20, 2017 (JP) .................................. 2017-203713

(51) Int. Cl.
H02G 3/04 (2006.01)
B60R 16/02 (2006.01)
H01B 7/00 (2006.01)
H02G 1/08 (2006.01)

(52) U.S. Cl.
CPC ....... *H02G 3/0418* (2013.01); *B60R 16/0215* (2013.01); *H01B 7/0045* (2013.01); *H02G 1/08* (2013.01); *H02G 3/0437* (2013.01); *H02G 3/0468* (2013.01); *H02G 3/0487* (2013.01)

(58) Field of Classification Search
CPC combination set(s) only.
See application file for complete search history.

(56) References Cited

U.S. PATENT DOCUMENTS

| 5,039,828 | A * | 8/1991 | Marks | H02G 3/0418 174/135 |
| 6,830,225 | B2 * | 12/2004 | Kato | H02G 3/0487 248/49 |
| 7,038,133 | B2 * | 5/2006 | Arai | H02G 3/0418 138/115 |
| 7,964,796 | B2 * | 6/2011 | Suzuki | H02G 3/0437 174/720 |
| 2003/0159846 | A1 * | 8/2003 | Takahashi | H02G 3/0608 174/68.3 |
| 2003/0173102 | A1 * | 9/2003 | Kishizawa | H02G 3/0481 174/68.1 |

(Continued)

FOREIGN PATENT DOCUMENTS

| CN | 201781234 U | 3/2011 |
| JP | 2003-250210 A | 9/2003 |

(Continued)

*Primary Examiner* — Binh B Tran
*Assistant Examiner* — Krystal Robinson
(74) *Attorney, Agent, or Firm* — Kenealy Vaidya LLP

(57) ABSTRACT

A wire harness protector includes: a main body defining a passage; and a plurality of covers. The main body defines the passage by a groove recessed in an attaching direction to allow the wire harness (WH) to be attached to the main body. The plurality of the covers includes a first cover covering an opening of the groove near one end, a second cover covering the opening near the other end, and a third cover connected to one of the first cover and the second cover while allowing its relative displacement to the one of the first cover and the second cover and covering the opening near the middle portion.

5 Claims, 6 Drawing Sheets

(56) References Cited

U.S. PATENT DOCUMENTS

2003/0183411 A1* 10/2003 Frantz ..................... H02G 3/32
                                                    174/72 A
2009/0211781 A1*  8/2009 Suzuki ................ B60R 16/0215
                                                    174/101

FOREIGN PATENT DOCUMENTS

| JP | 2005-65399 A | 3/2005 |
| JP | 4360392 B2 | 11/2009 |

* cited by examiner

WIRE HARNESS PROTECTOR AND MANUFACTURING METHOD OF WIRE HARNESS

CROSS-REFERENCES TO RELATED APPLICATION(S)

This application is based on and claims priority from Japanese Patent Application No. 2017-203713 filed on Oct. 20, 2017, and the entire contents of which are incorporated herein by reference.

BACKGROUND

Field of the Invention

The present invention relates to a protector to be attached to electric wires constituting a wire harness and a manufacturing method of a wire harness to which a protector is attached.

Description of Related Art

Wire harness protectors are known that define a passage (cavity or space) in which electric wires constituting a wire harness can be set. For example, protectors of this kind not only serve to protect electric wires housed therein but also are used as a fixing member in routing a wire harness on, for example, the vehicle body of an automobile.

One such conventional protector is equipped with a protector body having a three-dimensional shape with a groove structure that has a bottom wall and two side walls and is U-shaped in cross section and a cover for covering the opening of the protector body. In this conventional protector, electric wires are set in a passage defined by the bottom wall and the two side walls of the protector body and then fixed by attaching the cover to the protector body.

As for details of the above protector, refer to JP 4,360,392 B.

SUMMARY

In the conventional protector described above, the cover is attached to the protector body in a state that electric wires are fixed to the protector body by winding tapes on two respective end portions of the protector body and pushing the electric wires into the protector body at its central position by a pressing piece. With this attaching procedure, this conventional protector can suppress a phenomenon that the cover is attached to the protector body with electric wires separated (lifted up) from the protector body and, as a result, parts of the electric wires are sandwiched between the protector body and the cover, even if the protector body has a three-dimensional shape.

However, in actuality, the conventional protector has difficulty increasing the efficiency of work of attaching the protector to electric wires because it is necessary to fix the electric wires to the protector body by winding tapes on the protector body in attaching the protector to the electric wires. Furthermore, when the protector is removed from the electric wires for a certain reason after the electric wires were attached to the protector, work of removing the protector from the electric wires is difficult because it is necessary to remove the tapes that are wound around the protector and the electric wires.

An object of the invention is to provide a wire harness protector and a manufacturing method of a wire harness that are high in the efficiency of work of attaching it to electric wires constituting a wire harness.

Embodiments of the present invention provide the following items (1) to (3):
(1) A wire harness protector comprising:
  a main body defining a passage to receive an electric wire constituting a wire harness; and a plurality of covers to hold the electric wire in the passage,
  the main body defining the passage by a groove extending along a shape of the passage and being recessed in an attaching direction to allow the wire harness to be attached to the main body; the main body having a three-dimensional shape defined with one end of the passage, the other end of the passage, and a middle portion between the one end and the other end; one of the one end, the other end, and the middle portion being located at a different position in the attaching direction than the other two thereof, and
  the plurality of the covers including a first cover covering an opening of the groove near the one end and holding the electric wire, a second cover covering the opening near the other end and holding the electric wire, and a third cover connected to one of the first cover and the second cover while allowing its relative displacement to the one of the first cover and the second cover and covering the opening near the middle portion and holding the electric wire.
(2) The wire harness protector according to the item (1), wherein
  the first cover is connected to a portion near the one end of the main body to allow its relative displacement to the main body, and
  the second cover is connected to a portion near to the other end of the main body to allow its relative displacement to the main body.
(3) The wire harness protector according to the item (1) or item (2), wherein
  the main body has, in at least part of the passage, a lock projection for a corrugated tube attached to the electric wire to cover around the electric wire, and the lock projection locks the corrugate tube to eliminate an relative movement of the corrugated tube to the main body in an axial line direction of the passage.

According to first aspect of the invention, relating to the item (1), after the electric wires constituting the wire harness are set in the passage which is defined by the protector, the portions, adjacent to the one end and the other end of the passage, of the opening of the groove are covered with the first cover and the second cover, respectively. As a result, the electric wires are prevented from separating (lifting up) from the main body in the two respective end portions, adjacent to the one end and the other end, of the passage. Furthermore, the middle portion where the electric wires are particularly prone to separate from the main body because the main body has a three-dimensional shape is covered with the third cover, the electric wires are also prevented from separating from the main body in the middle portion.

Since the third cover is connected to one of the first cover and the second cover so as to be able to be displaced relative to it (e.g., rotatably about a hinge), work of covering the two end portions, adjacent to the two ends, of the passage with the first cover and the second cover, respectively, and work of covering the middle portion of the passage with the third cover can be performed continuously without any undue interval. For example, where the third cover is connected to the first cover, the worker can attach the third cover to the main body quickly without letting go of his or her hold on the first cover after attaching the first cover and the second cover to the main body. A similar thing is true of a case that the third cover is connected to the second cover.

As a result, according to the protector having the above configuration, since neither winding of a tape nor fixing by a pressing piece is necessary unlike in the conventional protector described above, the efficiency of work of attaching the protector to the electric wires constituting the wire harness can be increased. In addition, even if it becomes necessary to remove the protector from the electric wires, work that should be performed is merely disconnecting the plural covers from the main body. Thus, work for removing the protector from the electric wires is easier than in the conventional protector in which winding of a tape is necessary.

According to second aspect of the invention, relating to the item (2), the first cover and the second cover are connected to the main body so as to be able to be displaced relative to it (e.g., rotatably about respective hinges). Thus, for example, after setting the electric wires in the passage of the main body, a worker can cover the portions, adjacent to the two ends, of the opening of the groove by displacing the first cover and the second cover (e.g., rotating them about respective hinges) quickly without letting go of his or her hold on the main body. This makes the efficiency of work of attaching the protector to the electric wires higher than in a case that the first cover and the second cover are components that are independent of the main body.

According to third aspect of the invention, relating to the item (3), when the corrugated tubes are attached to the electric wires so as to cover them from outside, the corrugated tubes are locked by the groups of lock projections formed on the main body, whereby the corrugated tubes and the electric wires can be prevented from moving (deviating in position) in the axial line direction of the passage.

For example, if the groups of lock projections are formed at such positions as to be opposed to the first cover and the second cover, respectively, when the two end portions, adjacent to the one end and the other end, of the passage are covered with the first cover and the second cover, respectively, the corrugated tubes can be fixed there. Thus, the corrugated tubes and the electric wires can be prevented from deviating in position in the two portions of the passage. As a result, for example, an event can be prevented that the electric wires separate (lift up) from the passage in the middle portion of the passage when the electric wires are pushed inward from outside the main body after the first cover and the second cover are attached to the main body. This increases the efficiency of work of attaching the protector to the electric wires.

Embodiments of the present invention provide the following item (4):
(4) A manufacturing method of a wire harness having a protector attached to an electric wire constituting the wire harness, the protector comprising:
a main body defining a passage to receive the electric wire by a groove extending along a shape of the passage and being recessed in an attaching direction to allow the wire harness to be attached to the main body; the main body having a three-dimensional shape defined with one end of the passage, the other end of the passage, and a middle portion between the one end and the other end; one of the one end, the other end, and the middle portion being located at a different position in the attaching direction than the other two thereof; and a plurality of covers to hold the electric wire in the passage, the plurality of the covers including a first cover covering an opening of the groove near the one end and holding the electric wire, a second cover covering the opening near the other end and holding the electric wire, and a third cover connected to one of the first cover and the second cover while allowing its relative displacement to the one of the first cover and the second cover and covering the opening near the middle portion and holding the electric wire, the method comprising:
setting the electric wire in the passage upon the opening not being covered with the plurality of the covers;
attaching the first cover to the main body to cover the opening corresponding to the one end with the first cover;
attaching the second cover to the main body to cover the opening corresponding to the other end with the second cover; and
attaching the third cover to the main body to cover the opening corresponding to the middle portion with the third cover, after attaching the first cover and the second cover to the main body.

According to fourth aspect of the invention, relating to the item (4), after the step of setting the electric wires constituting the wire harness in the passage (i.e., in the groove that is recessed in the attaching direction) is executed, the step of covering the portions, adjacent to the one end and the other end of the passage, of the opening of the groove with the first cover and the second cover is executed, whereby the electric wires are prevented from separating (lifting up) from the main body in the two end portions of the passage. Furthermore, after the execution of the above steps, the step of covering the portion, in the middle portion (where the electric wires are particularly prone to separate from the main body because it has a three-dimensional structure), of the opening with the third cover is executed, whereby the electric wires are also prevented from separating from the main body in the middle portion of the passage.

Since the third cover is connected to one of the first cover and the second cover so as to be able to be displaced relative to it (e.g., rotatably about a hinge), the step of covering the two end portions, adjacent to the two ends, of the passage with the first cover and the second cover, respectively, and the step of covering the middle portion of the passage with the third cover can be performed continuously without any undue interval.

As a result, according to the above-described manufacturing method of a wire harness, the efficiency of work of attaching the protector to the electric wires constituting the wire harness can be increased. In addition, in the wire harness manufactured by this manufacturing method, even if it becomes necessary to remove the protector from the electric wires, work that should be performed is merely disconnecting the plural covers from the main body. Thus, work for removing the protector from the electric wires is easier than in the conventional protector in which winding of a tape is necessary.

The invention makes it possible to provide a wire harness protector and a manufacturing method of a wire harness that are high in the efficiency of work of attaching it to electric wires constituting a wire harness.

Several aspects of the invention have been described briefly above. The further details of the invention will be made clearer if the following description is read through with reference to the accompanying drawings.

DETAILED DESCRIPTION

Embodiment

Figure 1A:
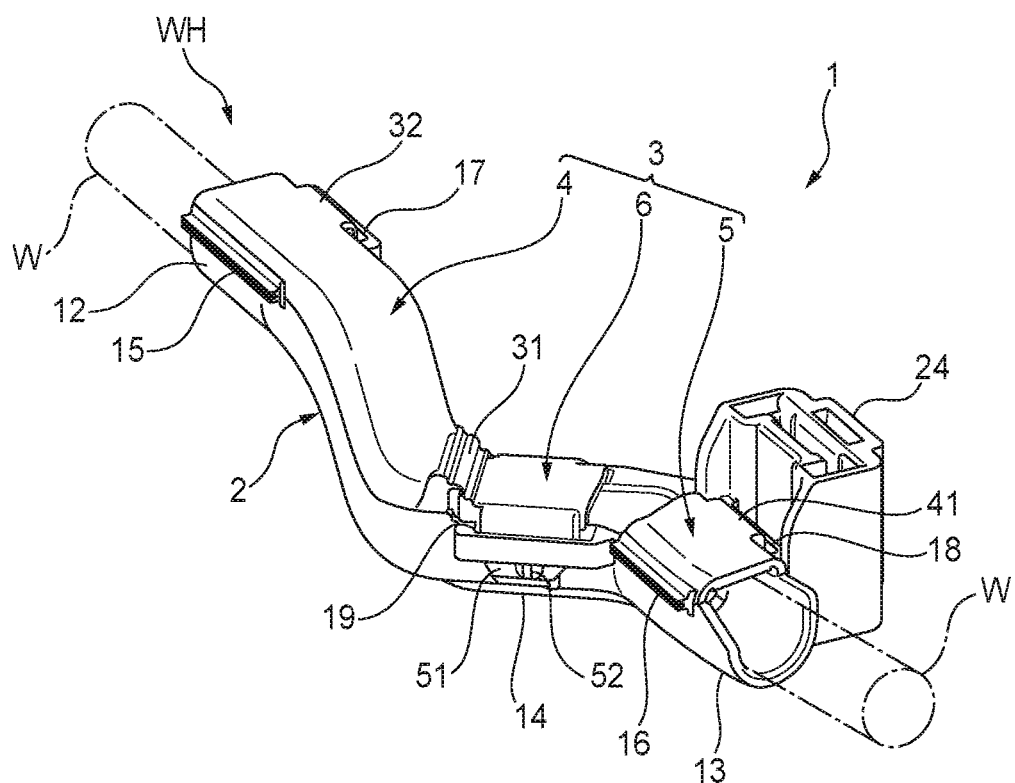
FIGS. 1A and 1B are perspective views, as viewed from the front side and the rear side, respectively, of a protector according to an embodiment of the present invention.
Figure 1B:
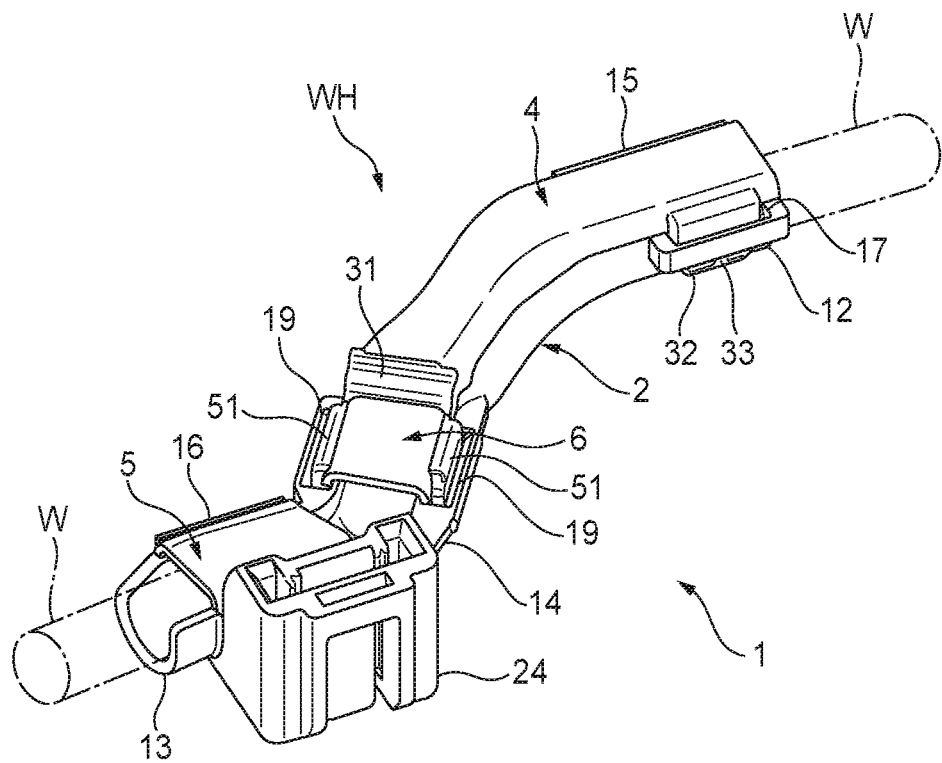

A wire harness protector 1 and a manufacturing method of a wire harness WH according to an embodiment of the present invention will be hereinafter described with reference to the drawings. The protector 1 is attached to part, in its axial line direction, of an electric wire bundle W of a wire harness WH and, typically, fixed to a prescribed portion, such as a vehicle body frame, of a vehicle. This serves to route the wire harness WH on the vehicle body.

As shown in FIGS. 1A and 1B and FIGS. 2A and 2B, the protector 1 is equipped with a main body 2 and covers 3. The covers 3 include a first cover 4, a second cover 5, and a third cover 6. The main body 2 and the covers 3 are made of a synthetic resin.

First, the main body 2 will be described. The main body 2 is a long member that is open at the top (has a pair of top edges) and is U-shaped in cross section, and defines a single, continuous passage 11 (U-shaped groove; see FIG. 2A) is which an electric wire bundle W (see FIGS. 3-6) of a wire harness WH can be set. In this manner, the passage 11 is defined by a groove that is recessed in the direction (top-bottom direction) in which the wire harness WH is attached to the main body 2.

The main body 2 has such a three-dimensional shape that one of one end 12 of the passage 11, the other end 13 of the passage 11, and a middle portion 14, between the one end 12 and the other end 13, of the passage 11 is located at a different position in the top-bottom direction (wire harness WH attaching direction) than the other two. In the embodiment, the other end 13 and the middle portion 14 are located approximately at the same position in the top-bottom direction and the one end 12 is located far above the middle portion 14.

Figure 2A:
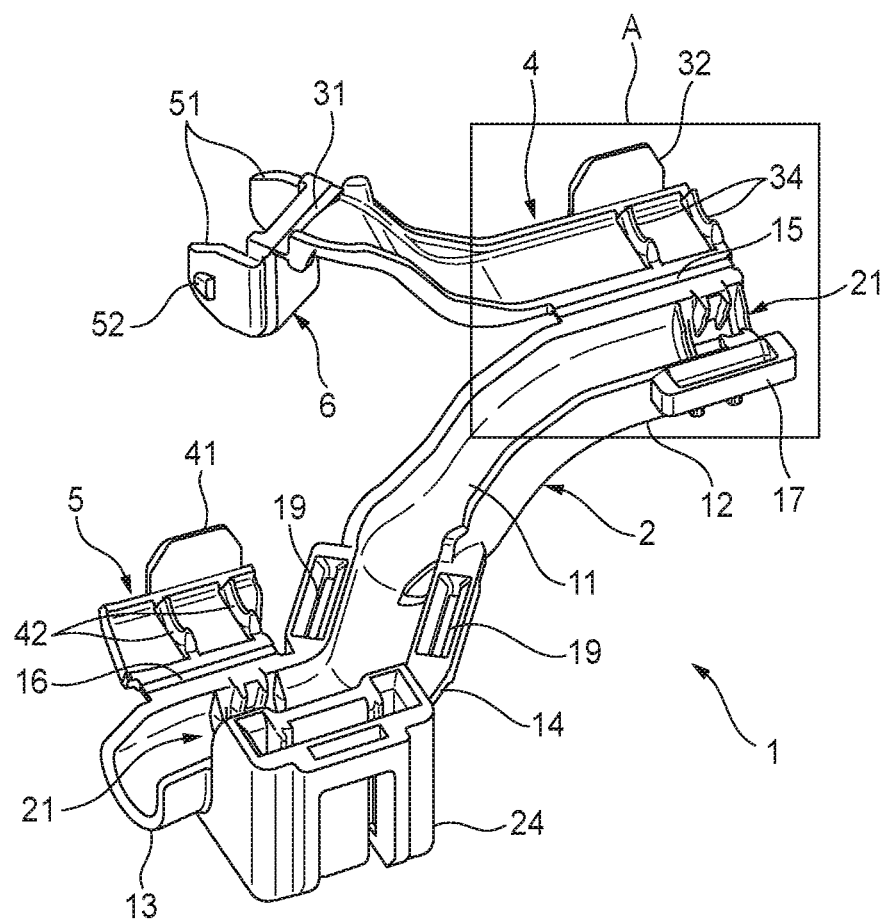
FIG. 2A is a perspective view of the protector in which covers are open.

As shown in FIG. 2A, the first cover 4 is connected rotatably to one of the pair of top edges of an end portion, on the side of the one end 12, of the main body 2 via a first hinge 15 which extends alongside the passage 11. On the other hand, the second cover 5 is connected rotatably to one of the pair of top edges of an end portion, on the side of the other end 13, of the main body 2 via a second hinge 16 which extends alongside the passage 11. The first cover 4 and the second cover 5 can be moved individually between a closed position (see FIGS. 1A and 1B) and an open position (see FIG. 2A).

The other of the pair of top edges of the end portion, where the first hinge 15 is formed, of the main body 2 has a frame portion that projects a little in the width direction and through which a lock hole 17 penetrates in the top-bottom direction. The lock hole 17 is formed so that a lock piece 32 of the first cover 4 is to be inserted into it.

Likewise, as shown in FIG. 1A, the other of the pair of top edges of the end portion, where the second hinge 16 formed, of the main body 2 has a frame portion that projects a little in the width direction and through which a lock hole 18 penetrates in the top-bottom direction. The lock hole 18 is formed so that a lock piece 41 of the second cover 5 is to be inserted into it.

The pair of top edges of the middle portion 14 of the main body 2 has a pair of frame portions that project a little in the width direction and through which a pair of lock holes 19 penetrate in the top-bottom direction, respectively. The pair of lock holes 19 are formed so that a pair of lock pieces 51 of the third cover 6 are to be inserted into them.

As shown in FIG. 2A, a group of lock projections 21 (plural lock projections 22 and 23) projects inward into the passage 11 (U-shaped groove) in each of the portion, where the first hinge 15 and the lock hole 17 are formed, of the main body 2 and the portion, where the second hinge 16 and the lock hole 18 are formed, of the main body 2. The groups of lock projections 21 are formed to lock corrugated tubes CC (see FIGS. 3-6) which cover the electric wire bundle W of the wire harness WH from outside so that the corrugated tubes CC do not move relative to the passage 11 in its axial line direction.

Figure 2B:
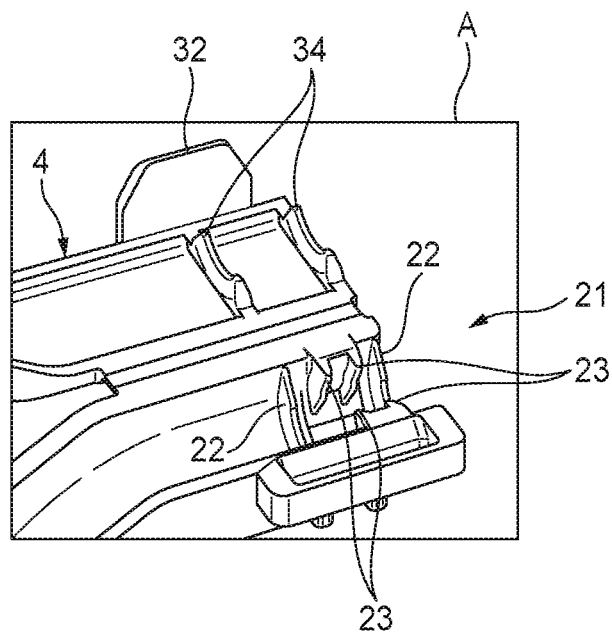
FIG. 2B is an enlarged view of part A of FIG. 2A.

As shown in FIG. 2B in an enlarged manner, each group of lock projections 21 consist of a pair of lock projections 22 and a pair of lock projections 23. The pair of lock projections 22 are spaced from each other in the axial line direction of the passage 11, and each lock projection 22 projects inward into the passage 11 from the bottom and the side walls of the passage 11 (U-shaped groove). The pair of lock projections 23 are located between the pair of lock projections 22 and spaced from each other in the axial line direction of the passage 11, and each lock projection 23 projects inward into the passage 11 from the side walls of the passage 11 (U-shaped groove). Although FIG. 2B shows only the group of lock projections 21 that are formed on the side of the one end 12 of the passage 11, the group of lock projections 21 that are formed on the side of the other end 13 of the passage 11 has the same structure as the former group of lock projections 21.

The outer side surface of the portion, where the lock hole 18 (see FIG. 1A) is formed, of the main body 2 is formed with, in an integrated manner, a fixing portion 24 for fixing the protector 1 to a prescribed position of a vehicle. The wire harness WH is routed on the vehicle body by fixing the fixing portion 24 to a prescribed portion, such as a vehicle body frame, of the vehicle in a state that the protector 1 is attached to the wire harness WH. The description of the main body 2 is completed here.

Next, the covers 3 will be described in order of the first cover 4, the second cover 5, and the third cover 6. As shown in FIGS. 2A and 2B, the first cover 4 is connected to the main body 2 by the first hinge 15. The first cover 4 is provided to have the electric wire bundle W be held in the passage 11 by closing the top opening of the main body 2 over a length from the one end 12 to the middle portion 14 of the main body 2 in the axial line direction of the passage 11.

The third cover 6 is connected rotatably to the end, on the side of the middle portion 14, of the first cover 4 by a third hinge 31 which extends perpendicularly to the passage 11 when the first cover 4 is closed. The third cover 6 can be moved between a closed position (see FIGS. 1A and 1B and FIG. 6) and an open position (see FIGS. 2A and 2B and FIG. 5).

The lock piece 32 projects downward (when the first cover 4 is closed) from the side edge, on the side opposite to the side of the first hinge 15, of the first cover 4. The outer side surface of the lock piece 32 is formed with projections 33 (see FIG. 1B). When the first cover 4 is closed, the lock piece 32 is inserted into the lock hole 17 of the main body 2 and the projections 33 are engaged with the edge of the portion that defines the lock hole 17, whereby the first cover 4 is held at the closed position.

As shown in FIG. 2B, the portion, between the lock piece 32 and the first hinge 15, of the inner surface (opposed to the electric wire bundle W) of the first cover 4 is formed with a pair of lock projections 34 at such positions that they are opposed to the pair of lock projections 22 of the main body 2. When the first cover 4 is closed, the pair of lock projections 22 and the pair of lock projections 34 hold the corrugated tube CC from both sides, whereby the corrugated tube CC is locked at the position close to the one end 12 of the main body 2 so as not to move in the axial line direction of the passage 11.

Next, the second cover 5 will be described. As described above, the second cover 5 is connected to the main body 2 by the second hinge 16. The second cover 5 is provided to have the electric wire bundle W be held in the passage 11 by closing the top opening of the main body 2 over a length from the other end 13 to the middle portion 14 in the axial line direction of the passage 11.

The lock piece 41 projects downward (when the second cover 5 is closed) from the side edge, on the side opposite to the side of the second hinge 16, of the second cover 5. The outer side surface of the lock piece 41 is formed with projections (not shown) that are similar to the above-mentioned projections 33. When the second cover 5 is closed, the lock piece 41 is inserted into the lock hole 18 (see FIG. 1A) of the main body 2 and the projections are engaged with the edge of the portion that defines the lock hole 18, whereby the second cover 5 is held at the closed position.

As shown in FIG. 2A, the portion, between the lock piece 41 and the second hinge 16, of the inner surface (opposed to the electric wire bundle W) of the second cover 5 is formed with a pair of lock projections 42 at such positions that they are opposed to the pair of lock projections 22 of the main body 2. When the second cover 5 is closed, the pair of lock projections 22 and the pair of lock projections 42 hold the corrugated tube CC from both sides, whereby the corrugated tube CC is locked at the position close to the other end 13 of the main body 2 so as not to move relative to the main body 2 in the axial line direction of the passage 11.

Next, the third cover 6 will be described. As described above, the third cover 6 is connected to the first cover 4 by the third hinge 31. The third cover 6 is provided to have the electric wire bundle W be held in the passage 11 by closing the top opening of the main body 2 in the middle portion 14.

The pair of lock pieces 51 project downward (when the third cover 6 is closed (and the first cover 4 is closed)). The outer side surface of each lock piece 51 is formed with a projection 52. When the third cover 6 is closed (and the first cover 4 is closed), the pair of lock pieces 51 are inserted into the pair of engagement holes 19, respectively, and the pair of projections 52 are engaged with the edges of the portions that define the pair of lock holes 19, respectively, whereby the third cover 6 is held at the closed position. The description of the covers 3 is completed here.

Figure 3:
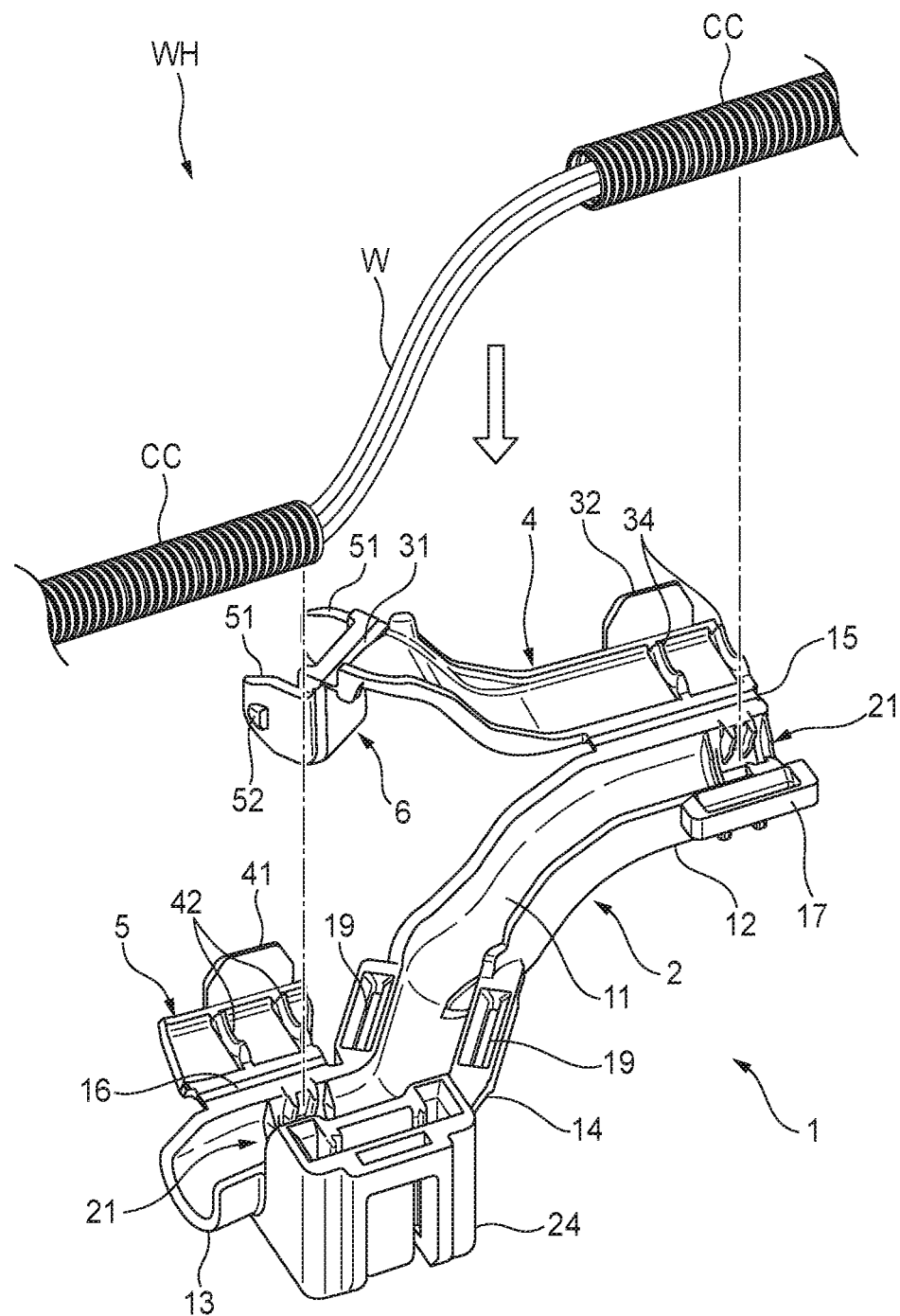
FIG. 3 is a first perspective view for description of a procedure for attaching the protector to a wire harness.

Next, a procedure for attaching the protector 1 to the electric wire bundle W will be described with reference to FIGS. 3-6. As shown in FIG. 3, the corrugated tubes CC are attached to the electric wire bundle W so as to cover the electric wire bundle W from outside. However, the electric wire bundle W is not covered with the corrugated tubes CC in a prescribed region in the axial line direction, that is, the electric wire bundle W is exposed in this region.

Figure 4:
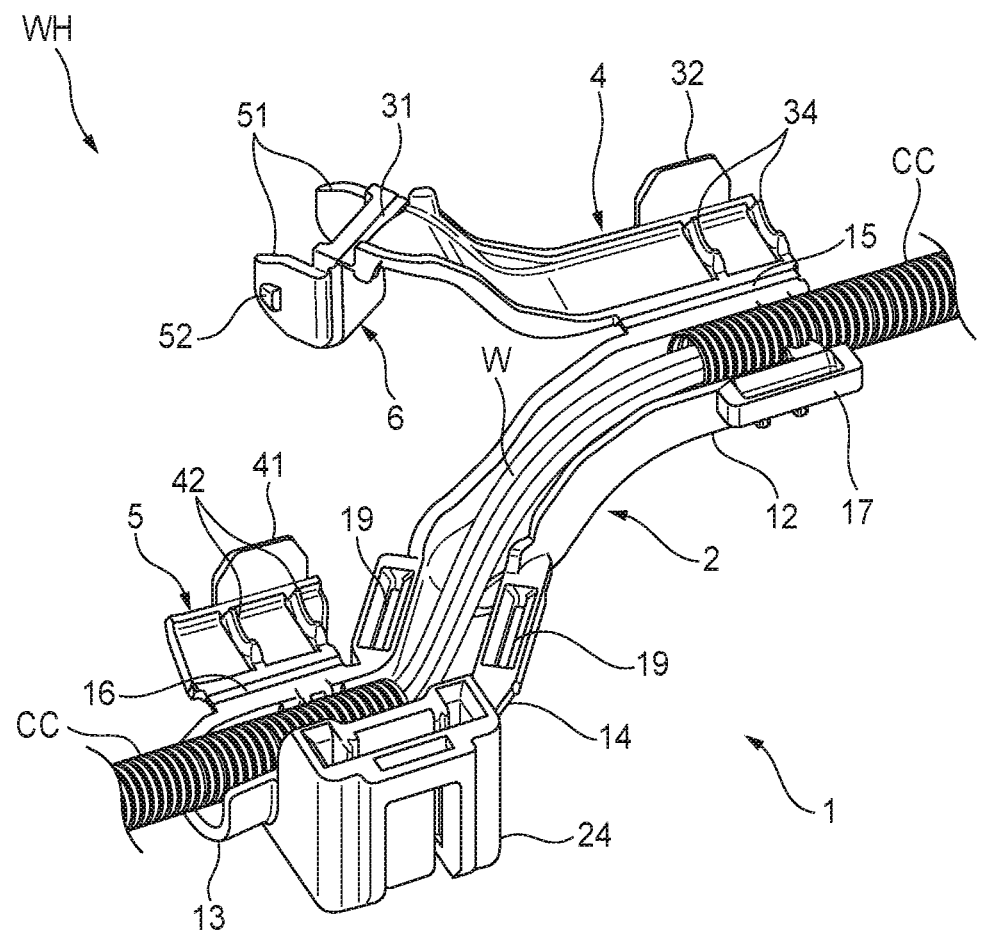
FIG. 4 is a second perspective view for description of the procedure for attaching the protector to the wire harness.

First, as indicated by a hollow arrow in FIG. 3, the electric wire bundle W is fitted into the main body 2 over the entire passage 11 of the protector 1 whose covers 3 are open so that the exposed portion of the electric wire bundle W is located in a portion, excluding two end portions, of the passage 11. As a result, as shown in FIG. 4, end portions, adjacent to the exposed portion of the electric wire bundle W, of the corrugated tubes CC are placed on the group of lock projections 21 adjacent to the one end 12 of the main body 2 and the group of lock projections 21 adjacent to the other end 13 of the main body 2, respectively.

Figure 5:
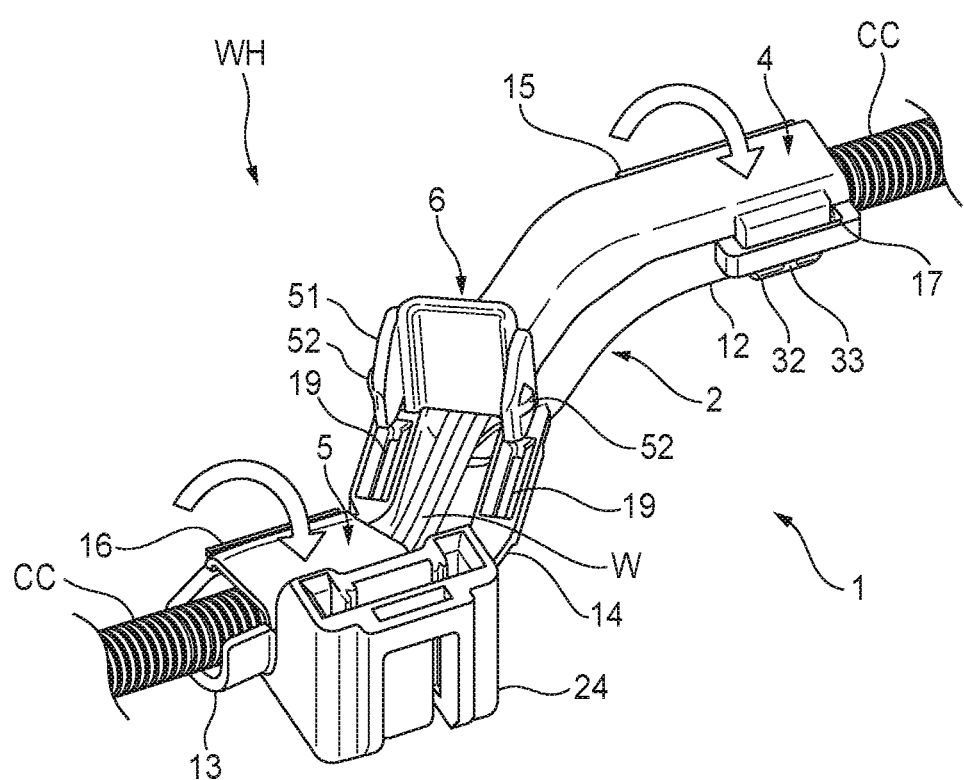
FIG. 5 is a third perspective view for description of the procedure for attaching the protector to the wire harness.

Then, as indicated by hollow arrow in FIG. 5, the first cover 4 and the second cover 5 are moved (rotated) from the open positions to the closed positions. At this time, one of the first cover 4 and the second cover 5 may be moved from the open position to the closed position after the other was moved from the open position to the closed position. Alternatively, the first cover 4 and the second cover 5 may be moved from the open positions to the closed positions at the same time.

As a result, the lock piece 32 of the first cover 4 is inserted into the lock hole 17 of the main body 2 and the projections 33 are engaged with the edge of the portion that defines the lock hole 17, whereby the first cover 4 is held at the closed position. Likewise, the lock piece 41 of the second cover 5 is inserted into the lock hole 18 of the main body 2 and the projections (not shown) of the lock piece 41 are engaged with the edge of the portion that defines the lock hole 18, whereby the second cover 5 is held at the closed position. As a result, the openings of the U-shaped groove adjacent to the one end 12 and the other end 13 are covered with the first cover 4 and the second cover 5, respectively, whereby the electric wire bundle W is prevented from separating (lifting up) from the main body 2 at two end portions of the passage 11.

Furthermore, an end portion of one of the corrugated tubes CC located on the two respective sides of the exposed portion of the electric wire bundle W is sandwiched between the group of lock projections 21 adjacent to the one end 12 of the main body 2 and the pair of lock projections 34 of the first cover 4 and an end portion of the other corrugated tube CC is sandwiched between the group of lock projections 21 adjacent to the other end 13 and the pair of lock projections 42 of the second cover 5, whereby both of the corrugated tubes CC are locked so as not to move relative to the main body 2 in the axial line direction of the passage 11.

Figure 6:
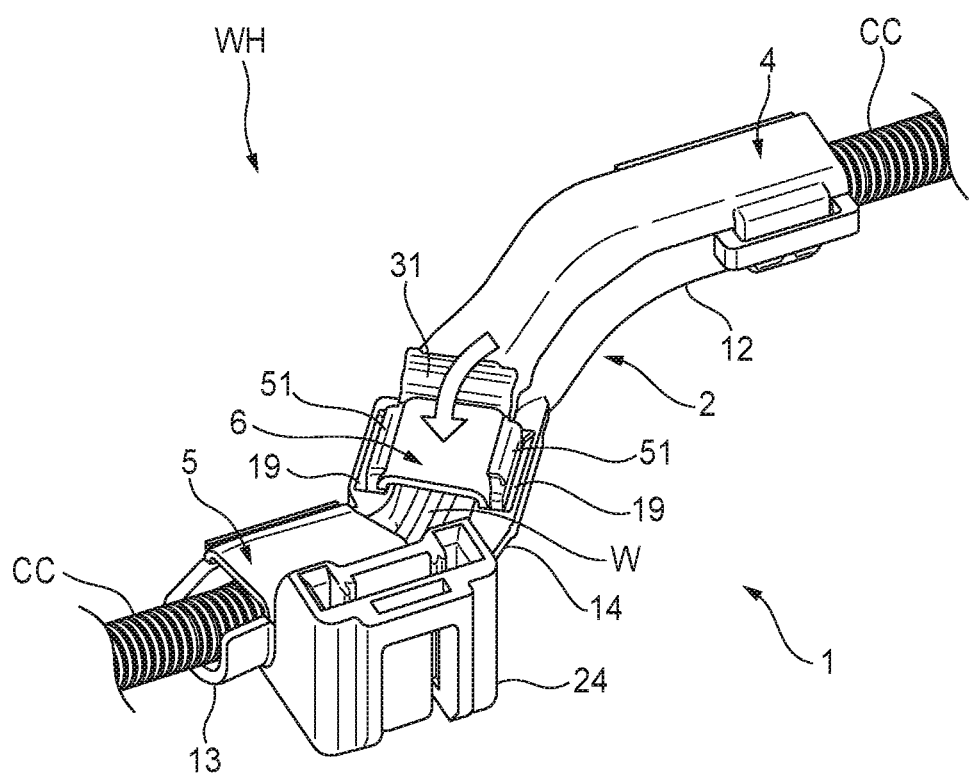
FIG. 6 is a fourth perspective view for description of the procedure for attaching the protector to the wire harness.

Subsequently, as indicated by a hollow arrow in FIG. 6, the third cover 6 is moved from the open position to the closed position. As a result, the pair of lock pieces 51 of the third cover 6 are inserted into the pair of lock holes 19 of the main body 2, whereby the third cover 6 is held at the closed position. In this manner, the middle portion 14 where the electric wire bundle W is particularly prone to separate from the main body 2 because the main body 2 has a three-dimensional shape is covered with the third cover 6, whereby the electric wire bundle W can be prevented from separating (lifting up) from the main body 2 in the middle portion 14. Furthermore, in doing the above assembling work, the worker can attach the third cover 6 to the main body 2 quickly without letting go of his or her hold on the first cover 4 after attaching the first cover 4 and the second cover 5 to the main body 2.

The attachment of the protector 1 to the electric wire bundle W, that is, the manufacture of a wire harness WH having the protector 1, is completed according to the above procedure. After the completion of the attachment of the protector 1 to the electric wire bundle W, the fixing portion 24 of the main body 2 is fixed to a prescribed portion of a vehicle body frame of a vehicle, whereby the wire harness WH is routed on the vehicle body.

As described above, in the protector 1 and the manufacturing of a wire harness WH according to the embodiment of the invention, after the electric wire bundle W constituting the wire harness WH is set in the passage 11 which is defined by the protector 1, the portions, adjacent to the one end 12 and the other end 13 of the passage 11, of the opening of the groove are covered with the first cover 4 and the second cover 5, respectively. As a result, the electric wire bundle W is prevented from separating from the main body 2 in the two respective end portions, adjacent to the one end 12 and the other end 13, of the passage 11. In this state, the middle portion 14 where the electric wire bundle W is particularly prone to separate from the main body 2 because the main body 2 has a three-dimensional shape is covered with the third cover 6, whereby the electric wire bundle W is prevented from separating from the main body 2 in the middle portion 14.

Since the third cover 6 is connected to the first cover 4 rotatably by the first hinge 15, work of covering the two end portions, adjacent to the one end 12 and the other end 13, of the passage 11 with the first cover 4 and the second cover 5, respectively, and work of covering the middle portion 14 of the passage 11 with the third cover 6 can be performed continuously without any undue interval.

As a result, according to the protector 1 having the above configuration, the efficiency of work of attaching the protector 1 to the electric wire bundle W constituting the wire harness WH can be increased. In addition, since no tape is wound around the main body 2 and the electric wire bundle W unlike in the conventional protector described above, the protector 1 can easily be removed from the electric wire bundle W even if it becomes necessary to do so.

Furthermore, since the first cover 4 and the second cover 5 are connected to the main body 2 by the first hinge 15 and the second hinge 16, respectively, after the electric wire bundle W was set in the passage 11 of the main body 2, the portions, adjacent to the first end 12 and the other end 13, of the opening of the groove can be covered merely by rotating the first cover 4 and the second cover 5. This increases the efficiency of work of attaching the protector 1 to the electric wire bundle W.

Still further, since the corrugated tubes CC which cover the electric wire bundle W from outside are locked by the groups of lock projections 21 formed on the main body 2, the corrugated tubes CC and the electric wire bundle W can be prevented from moving (deviating in position) in the axial line direction of the passage 11. More specifically, the groups of lock projections 21 are formed at such positions as to be opposed to the first cover 4 and the second cover 5, respectively. Thus, when the two end portions, adjacent to the one end 12 and the other end 13, of the passage 11 are covered with the first cover 4 and the second cover 5, respectively, the corrugated tubes CC can be prevented from deviating in position in these portions. As a result, for example, an event can be prevented that the electric wire bundle W separates from the passage 11 in the middle portion 14 of the passage 11 when the electric wire bundle W is pushed inward from outside the main body 2 after the two end portions, adjacent to the one end 12 and the other end 13, of the passage 11 were covered with the first cover 4 and the second cover 5, respectively. This increases the efficiency of work of attaching the protector 1 to the electric wire bundle W.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, although in the embodiment the third cover 6 is connected to the first cover 4 so as to be able to be displaced relative to it, the third cover 6 may be connected to the second cover 5 so as to be able to be displaced relative to it. Although in the embodiment the first cover 4 and the second cover 5 are connected to the main body 2 so as to be able to be displaced relative to it, they need not always be connected to the main body 2.

In the embodiment, the groups of lock projections 21 are formed at such positions as to be able to be opposed to the first cover 4 and the second cover 5, respectively. Alternatively, a group of lock projections 21 may be formed at such a position as to be able to be opposed to only one of the first cover 4 and the second cover 5. As a further alternative, no group of lock projections 21 may be formed on the main body 2.

Features of the protector 1 and the manufacturing method of a wire harness WH according to the invention will now be summarized concisely below in the form of items [1] to [4]:

[1] A wire harness protector (1) comprising:
    a main body (2) defining a passage (11) to receive an electric wire (W) constituting a wire harness (WH); and a plurality of covers (3) to hold the electric wire in the passage,
    the main body (2) defining the passage (11) by a groove extending along a shape of the passage and being recessed in an attaching direction to allow the wire harness (WH) to be attached to the main body; the main body (2) having a three-dimensional shape defined with one end (12) of the passage, the other end (13) of the passage, and a middle portion (14) between the one end and the other end; one of the one end (12), the other end (13), and the middle portion (14) being located at a different position in the attaching direction than the other two thereof, and
    the plurality of the covers (3) including a first cover (4) covering an opening of the groove near the one end (12) and holding the electric wire (W), a second cover (5) covering the opening near the other end (13) and holding the electric wire, and a third cover (6) connected to one of the first cover (4) and the second cover (5) while allowing its (6's) relative displacement to the one of the first cover and the second cover and covering the opening near the middle portion (14) and holding the electric wire.

[2] The wire harness protector (1) according to the item [1], wherein
the first cover (4) is connected to a portion near the one end (12) of the main body (2) to allow its (4's) relative displacement to the main body, and
the second cover (5) is connected to a portion near to the other end (13) of the main body to allow its (5's) relative displacement to the main body.

[3] The wire harness protector according to the item [1] or the item [2], wherein
the main body (2) has, in at least part of the passage (11), a lock projection (21) for a corrugated tube (CC) attached to the electric wire (W) to cover around the electric wire (W), and the lock projection locks the corrugate tube to eliminate an relative movement of the corrugated tube (CC) to the main body (2) in an axial line direction of the passage.

[4] A manufacturing method of a wire harness (WH) having a protector (1) attached to an electric wire (W) constituting the wire harness,
the protector (1) comprising:
a main body (2) defining a passage (11) to receive the electric wire (W) by a groove extending along a shape of the passage and being recessed in an attaching direction to allow the wire harness (WH) to be attached to the main body; the main body (2) having a three-dimensional shape defined with one end (12) of the passage, the other end (13) of the passage, and a middle portion (14) between the one end and the other end; one of the one end (12), the other end (13), and the middle portion (13) being located at a different position in the attaching direction than the other two thereof; and
a plurality of covers (3) to hold the electric wire in the passage (11), the plurality of the covers including a first cover (4) covering an opening of the groove near the one end (12) and holding the electric wire, a second cover (5) covering the opening near the other end (13) and holding the electric wire, and a third cover (6) connected to one of the first cover (4) and the second cover (5) while allowing its (6's) relative displacement to the one of the first cover and the second cover and covering the opening near the middle portion (14) and holding the electric wire,
the method comprising:
setting the electric wire (W) in the passage (11) upon the opening not being covered with the plurality of the covers (3);
attaching the first cover (4) to the main body (2) to cover the opening corresponding to the one end (12) with the first cover;
attaching the second cover (5) to the main body (2) to cover the opening corresponding to the other end (13) with the second cover; and
attaching the third cover (6) to the main body (2) to cover the opening corresponding to the middle portion (14) with the third cover, after attaching the first cover (4) and the second cover (5) to the main body.

REFERENCE SIGNS LIST

1: Protector
2: Main body
3: Cover
4: First cover (cover)
5: Second cover (cover)
6: Third cover (cover)
11: Passage
12: One end
13: The other end
14: Middle portion
21: Group of lock projections (lock projections)
22: Lock projection
23: Lock projection
CC: Corrugated tube
W: Electric wire bundle (electric wires)
WH: Wire harness

The invention claimed is:
1. A wire harness protector comprising:
a main body defining a passage to receive an electric wire constituting a wire harness; and a plurality of covers to hold the electric wire in the passage,
the main body defining the passage by a groove extending along a shape of the passage and being recessed in an attaching direction to allow the wire harness to be attached to the main body; the main body having a three-dimensional shape defined with one end of the passage, the other end of the passage, and a middle portion between the one end and the other end; one of the one end, the other end, and the middle portion being located at a different position in the attaching direction than the other two thereof,
the plurality of the covers including a first cover covering an opening of the groove near the one end and holding the electric wire, a second cover covering the opening near the other end and holding the electric wire, and a third cover connected to one of the first cover and the second cover while allowing its relative displacement to the one of the first cover and the second cover and covering the opening near the middle portion and holding the electric wire, and
the one of the first cover and second cover connected to the third cover extending further along the shape of the passage than the third cover extends along the shape of the passage.

2. The wire harness protector according to claim 1, wherein
the first cover is connected to a portion near the one end of the main body to allow its relative displacement to the main body, and
the second cover is connected to a portion near to the other end of the main body to allow its relative displacement to the main body.

3. The wire harness protector according to claim 1, wherein
the main body has, in at least part of the passage, a lock projection for a corrugated tube attached to the electric wire to cover around the electric wire, and the lock projection locks the corrugate tube to eliminate an relative movement of the corrugated tube to the main body in an axial line direction of the passage.

4. The wire harness protector according to claim 1, wherein
the one of the first cover and the second cover connected to the third cover extends further along the shape of the passage than the other one of the first cover and the second cover extends along the shape of the passage.

5. A manufacturing method of a wire harness having a protector attached to an electric wire constituting the wire harness,
the protector comprising:

a main body defining a passage to receive the electric wire by a groove extending along a shape of the passage and being recessed in an attaching direction to allow the wire harness to be attached to the main body; the main body having a three-dimensional shape defined with one end of the passage, the other end of the passage, and a middle portion between the one end and the other end; one of the one end, the other end, and the middle portion being located at a different position in the attaching direction than the other two thereof; and a plurality of covers to hold the electric wire in the passage, the plurality of the covers including a first cover covering an opening of the groove near the one end and holding the electric wire, a second cover covering the opening near the other end and holding the electric wire, and a third cover connected to one of the first cover and the second cover while allowing its relative displacement to the one of the first cover and the second cover and covering the opening near the middle portion and holding the electric wire, and wherein the one of the first cover and second cover connected to the third cover extends further along the shape of the passage than the third cover extends along the shape of the passage, the method comprising:

setting the electric wire in the passage upon the opening not being covered with the plurality of the covers;

attaching the first cover to the main body to cover the opening corresponding to the one end with the first cover;

attaching the second cover to the main body to cover the opening corresponding to the other end with the second cover; and attaching the third cover to the main body to cover the opening corresponding to the middle portion with the third cover, after attaching the first cover and the second cover to the main body.

* * * * *